United States Patent Office 3,772,335
Patented Nov. 13, 1973

3,772,335
WATER-SOLUBLE REACTIVE XANTHENIUM DYESTUFFS
Fritz Meininger, Frankfurt am Main, and Folker Kohlhaas, Kelkheim, Taunus, Germany, assignors to Farbwerke Hoechst Aktiengesellschaft vormals Meister Lucius & Bruning, Frankfurt am Main, Germany
No Drawing. Filed Nov. 4, 1970, Ser. No. 86,941
Claims priority, application Germany, Nov. 6, 1969, P 19 55 849.7
Int. Cl. C07d 7/42
U.S. Cl. 260—336         9 Claims

ABSTRACT OF THE DISCLOSURE

A water-soluble reactive xanthenium dyestuff of the Formula 1

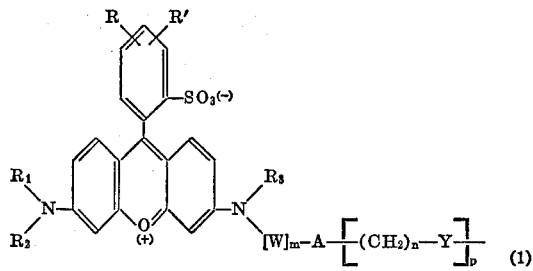

(1)

wherein R represents hydrogen, chlorine, hydroxyl, lower alkoxy, lower alkyl, carboxyl or a sulfonic acid group, R' represents hydrogen or carboxyl, $R_1$ stands for lower alkyl, carboxyl-lower alkyl, $HO_3S$ lower alkyl, $HO_3S$—O— lower alkyl, lower alkyl-phenyl or cyclohexyl, $R_2$ stands for hydrogen, lower alkyl, carboxyl-lower alky, and $R_1$ and $R_2$ represent together with the nitrogen atom morpholyl or piperidyl, $R_3$ represents hydrogen or lower alkyl, A stands for phenylene, biphenylene, naphthylene, nitro diphenylamine, lower alkyl-azo-phenyl, lower alkyl-phenylene, lower alkoxy-phenylene, lower alkyl-alkoxy-phenylene, carboxy-phenylene, hydroxy-phenylene, monosulfo-phenylene, chlorophenylene, and W represents as a bivalent bridging member —$CH_2$—, —NH—,

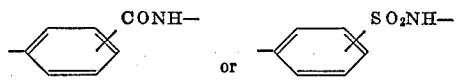

Y represents a grouping of the formula

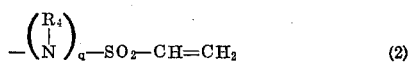     (2)

or

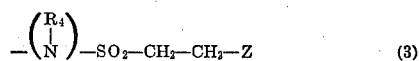     (3)

wherin Z stands for hydroxyl or chlorine, an arylsulfonic acid ester group, lower alkylsulfonic acid ester group, thiosulfuric acid ester group, phosphoric acid ester group, sulfuric acid ester group, dialkylamino, acetyl or phenoxy, $R_4$ represents hydrogen or lower alkyl, m and n stand for 0, 1 or 2, q for 0 or 1 and p for 1 or 2, said said dyestuffs being suitable for the dyeing or printing of leather, wool, silk or polyamide or polyurethane fibres, and particularly of native or regenerated cellulose fibres, the dyeings and prints obtained on said fibrous materials being distinguished by bluish red to violet shade and by good fastness to wet processing.

---

The present invention concerns new reactive xanthenium dyestuffs of the Formula 1

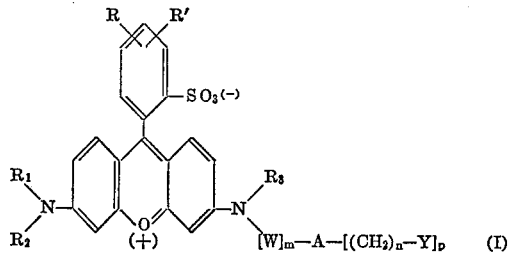

(I)

wherein R and R' represent hydrogen atoms, halogen atoms such as fluorine, chlorine or bromine atoms, or hydroxyl, alkyl, alkoxy, carboxyl or sulfonic acid groups, $R_1$ and $R_2$ stand for hydrogen atoms or alkyl groups which may be substituted by halogen atoms or hydroxyl-, carboxyl-, sulfonic acid or phenyl groups or —$OSO_3H$— or —HN-acyl groups and $R_1$ and $R_2$ may together with the nitrogen atom represent an alkylene imine ring optionally containing heterogen atoms, for example the radical of piperidine or morpholine, $R_3$ represents a hydrogen atom or an alkyl group, A stands for a mono-nuclear or bi-nuclear aromatic radical, for example a phenylene or naphthylene group or a diphenyl, diphenyl ether, diphenyl amine, diphenyl sulfide, diphenyl sulfone or azobenzene radical, the aromatic nucleus of which may be substituted by halogen atoms, lower alkyl groups, lower alkoxy groups, hydroxy-, carboxyl-, sulfonic acid or nitro groups, and W represents a bivalent bridging member, such as the group —$CH_2$—, —$CH_2$—$CH_2$—, —NH—,

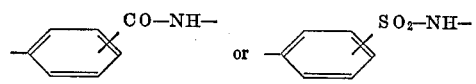

Y represents a grouping of the formula

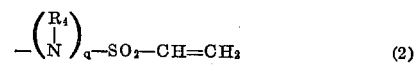     (2)

or

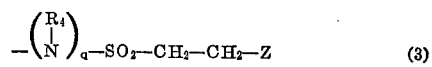     (3)

in which Z stands for the hydroxyl group or an organic or inorganic substituent capable of being split off by means of an alkaline agent, $R_4$ represents a hydrogen atom or an alkyl group, m and n each stand for 0, 1 or 2, q stands for 0 or 1, and p stands for 1 or 2, and a process for their preparation.

As substituent Z which may be split off by means of alkaline agent there are considered for example: halogen atoms, such as chlorine or bromine atoms, an alkylsulfonic acid ester group or arylsulfonic acid ester group, an acyloxy group, such as the acetoxy group, furthermore the phenoxy group or a dialkylamino group, such as the dimethyl- or diethylamino group, moreover the thiosulfuric acid ester group, the phosphoric acid ester group and especially the sulfuric acid ester group.

The new xanthenium dyestuffs of the above General Formula 1 may be prepared by reacting 1 mol of a dihalogen xanthylium compound of the general Formula 4

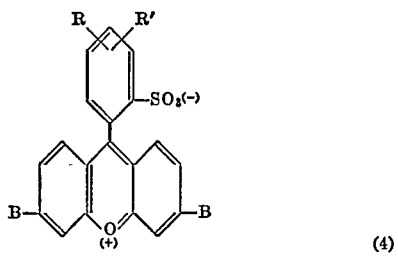

in which the substituents B represent chlorine or bromine atoms and R and R' have the above meanings, with at least 1 mol of an amino compound having the general Formula 5

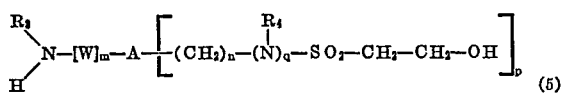

wherein $R_3$, W, A, $R_4$, m, n, p and q have the meanings indicated above, or with an amine having the General Formula 6

wherein $R_1$ and $R_2$ have the above meanings, in an aqueous, aqueous-organic or organic medium, between about 0° and 120° C., preferably between about 20° C. and 80° C., if desired, in the presence of an acid-binding agent, and by reacting subsequently the so-obtained monocondensation product with at least 1 mol of an amine of the mentioned Formula 6 or of an amino compound of the mentioned Formula 5 in an aqueous, aqueous-organic or organic medium between about 70° and 200° C., preferably between about 90° and 160° C., in the presence of acid-binding agents and by converting the so-obtained xanthylium compounds of the general Formula 7

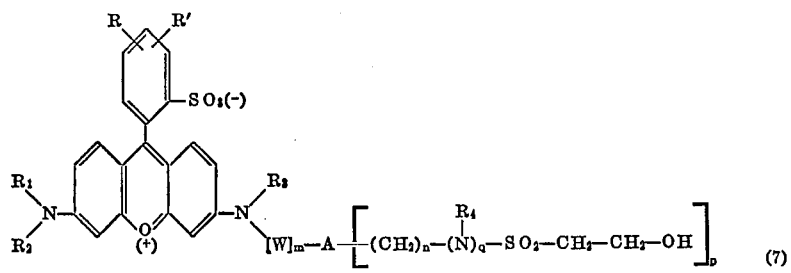

wherein $R_1$, $R_2$, R, R', $R_3$, $R_4$, W, A, m, n, q and p have the meanings indicated above, if desired by treating with sulfatizing phosphorylating, or halogenating agents, alkyl- or aryl-sulfonic acid halides or alkyl- or arylcarboxylic acid halides or -carboxylic acid anhydrides, into the xanthenium dyestuffs of the mentioned Formula 1, in which Z represents the group —O—$SO_3H$, —O—$PO_3H_2$, -halogen or —O-acyl, and by converting the so-obtained dyestuffs, if desired, by treatment with alkaline agents such as alkali hydroxide or alkali carbonate, for example sodium hydroxide or sodium carbonate, into dyestuffs having the General Formula 1, in which Y stands for the grouping

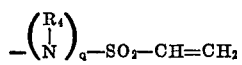

and by converting the dyestuffs thus obtained, if desired, by reaction (addition) with salts of the thiosulfuric acid, such as sodium thiosulfate, with dialkylamines, for example dimethyl or diethylamine or with phenol, into dyestuffs having the General Formula 1, in which Z represents —S—$SO_3H$, —N(alkyl)$_2$ or

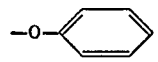

Suitable sulfatizing agents are for example concentrated sulfuric acid, chlorosulfonic acid, amidosulfonic acid or compounds yielding sulfur trioxides. Suitable phosphorylating agents are for example concentrated phosphoric acid, pyro-, meta- or polyphosphoric acid, polyphosphoric acid alkyl ester, phosphoroxy chloride or mixtures of phosphoric acid and phosphorus-(V)-oxide. As halogenating agents there are used for example thionylchloride or thionylbromide.

As dihalogen compounds suitable according to the invention having the Formula 4 there are considered, for example:

3,6-dichloro-xanthylium-9-phenyl-4-sulfo-2'-suplfonate,
3,6-dichloro-xanthylium-9-phenyl-4-sulfo-2'-sulfonate,
3,6-dichloro-xlanthylium-9-phenyl-4'-methoxy-2'-sulfonate,
3,6-dichloro-xanthylium-9-phenyl-4'-carboxy-2'-sulfonate,
3,6-dichloro-xanthylium-9-phenyl-4'-carboxy-2'-sul-
3,6-dichloroxanthylium-9-phenyl-4'-hydroxy-5'-carboxy-2'-sulfonate,
3,6-dibromo-xanthylium-9-phenyl-4'-chloro-2'-sulfonate, and
3,6-dichloro-xanthylium-9-phenyl-4'-chloro-2'-sulfonate.

As amines suitable according to the process of the present invention there are considered for example:

4-aminophenyl-β-hydroxy-ethylsulfone,
4-aminobenzyl-β-hydroxy-ethylsulfone,
4-aminophenethyl-β-hydroxy-ethyl-sulfone,
4-(ω-aminomethyl)-phenyl-β-hydroxy-ethylsulfone,
4-(ω-aminoethyl)-phenyl-β-hydroxy-ethylsulfone,
3-hydroxy-4-aminophenyl-β-hydroxy-ethylsulfone,
3-hydroxy-4-aminophenyl-β-hydroxy-ethylsulfone,
3,6-dimethoxy-4-aminophenyl-β-hydroxy-ethylsulfone,
3-methoxy-4-amino-6-methyl-phenyl-β-hydroxy-ethylsulfone,
3-aminophenyl-β-hydroxy-ethylsulfone,
4'-amino-3-benzoyl-aminophenyl-β-hydroxy-ethylsulfone,
3-aminobenzyl-β-hydroxy-ethylsulfone,
3-amino-4-methoxy-phenyl-β-hydroxy-ethylsulfone,
3-amino-4-hydroxy-phenyl-β-hydroxy-ethylsulfone,
3-amino-4-carboxy-phenyl-β-hydroxy-ethylsulfone,
3-amino-4-sulfo-phenyl-β-hydroxy-ethylsulfone,
3-amino-4-methoxy-benzyl-β-hydroxy-ethylsulfone,
5-amino-2-methyl-m-xylyl-α$^1$,α$^3$-bis(sulfonylethanol),
4-hydrazinophenyl-β-hydroxy-ethylsulfone,
4-aminobiphenylyl-4'-(β-hydroxy-ethylsulfone),
5-amino-naphthyl-1-(β-hydroxy-ethylsulfone),
5-amino-naphthyl-1-methylene-β-hydroxy-ethylsulfone,
6-aminonaphthyl-1-(β-hydroxy-ethylsulfone),
4-amino-2'-nitrodiphenylamino-4'-(β-hydroxy-ethylsulfone),
2-methyl-4-amino-azobenzol-4'-(β-hydroxyethylsulfone).

As amines suitable according to the invention having the formula $HNR_1R_2$ there may be considered for example n-propylamine, cyclohexylamine, piperidine, morpholine, benzylamine, phenethylamine, β-aminoethanol, aminoacetic acid, imino-diacetic acid, taurine or N-methyl taurine.

Suitable organic solvents which, if desired mixed with water, may be present in the first condensation step of the dihalogenxanthylium compounds of the Formula 4 with the amines of the Formula 5 or the Formula 6, are for example acetone, mehanol, ethanol or dimethylformamide. The molar ratio of the components being reacted in the first condensation phase expediently amounts to 1:1, however, a little excess of the amino component, for example about 1.1 mols, may be used.

Suitable organic solvents which may be present, if desired, mixed with water, in the further condensation of the obtained monohalogenated xanthylium compounds with the amines of the Formula 6 or 5 (second condensation step), are for example: dimethylformamide, dimethylsulfoxide, ethylene glycol or glycerine. As acid-binding agents employed in this second condensation step there are considered either the amines used in excess having the Formula 5 or 6 or preferably inorganic compounds such as sodium hydroxide solution, sodiumbicarbonate or sodium carbonate. The addition of an acid-binding agent is recommended because it must be expected otherwise that the condensation does not proceed completely.

In the second condensation phase the amine must be employed at least in a molar ratio of 1:1, calculated on the monohalogen xanthylium compounds to be reacted. The amine may also be used in a higher molar excess. This way is practically used if the amine shall simultaneously serve as acid-binding agent.

The isolation of the xanthenium dyestuffs of the Formula 1 obtained according to the process described, proceeds via salting out, for example with sodium chloride, potassium chloride or sodium sulfate or by spray drying of the preparation mixture.

The new reactive xanthenium dyestuffs of the mentioned General Formula 1 are very suitable for the dyeing and printing of different fibre materials such as wool, silk, leather, polyamide or polyurethane fibres, especially of fibre materials containing cellulose, as for example cotton, spun rayon and linen. They may be employed according to the dyeing and printing processes generally used in the case of reactive dyestuffs on a technical scale, and they yield on cellulose fibre materials in the presence of alkaline agents bright bluish red to violet dyeings and prints being partly very brilliant and having good fastness properties, especially good fastness to wet processing.

In comparison to known dyestuffs from the German patent specifications Nos. 965,902 (Example 49), 1,235,-257 (Example 13) and 1,262,213 (Example 13) the new dyestuffs are distinguished by a better resistance of the alkaline pads baths and alkaline printing pastes.

The following examples serve to illustrate the invention. Parts and percentages are by weight unless otherwise stated.

EXAMPLE 1

20.1 parts of 3-aminophenyl-β-hydroxy-ethylsulfone were reacted in water at 80° C. with 40.5 parts of 3,6-dichloro-xanthylium-9-phenyl-2′-sulfonate. After neutralisation with sodium hydroxide solution, 5 parts of sodium carbonate and 16.2 parts of the sodium salt of N-methyltaurine were introduced into the suspension of the condensation product and the whole was heated under reflux condensation for two hours. The so-obtained dyestuff was isolated by evaporating until dry, then introduced in a finely pulverized form into the threefold amount of concentrated sulfuric acid and stirred until complete dissolution. This solution was poured onto ice and neutralized with calcium carbonate. Subsequently it was filtered and the dyestuff which as free acid corresponded to the formula

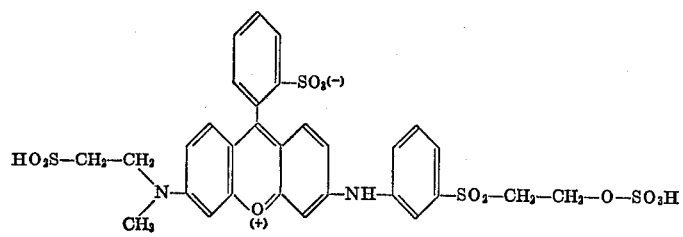

was isolated by evaporating the filtrate until dry in vacuo at about 80° C.

A red brown powder was obtained which dissolved in water with a bluish red color.

30 parts of the so-obtained dyestuff were mixed with 80 parts of urea and dissolved in 250 parts of water at about 80° C. At 40° C., 400 parts of neutral alginate thickening and 15 parts of sodiumbicarbonate were introduced by stirring into this solution. After printing on cotton fabric the material was dried and steam-treated for 10 minutes. Subsequently the whole was soaped and rinsed. A very brilliant, bluish red printing sample was obtained which had a very good fastness to washing.

EXAMPLE 2

20.1 parts of 4-amino-phenyl-β-hydroxy-ethylsulfone were dissolved in 100 parts of alcohol, mixed with 40.5 parts of 3,6-dichloroxanthylium-9-phenyl-2′-sulfonate and boiled for two hours under reflux condensation. The separated product was filtered hot, washed with alcohol and dried at 80° C. in vacuo. The resulting dyestuff powder was then introduced while stirring into 100 parts of water. 4 parts of sodium hydroxide and 16.2 parts of the sodium salt of N-methyl-taurine were added, and the mixture was boiled for two hours under reflux condensation. The resulting dyestuff was salted out with sodium sulfate, filtered and dried. The dyestuff powder was introduced into the threefold amount of sulfuric acid of 100% strength and stirred until complete dissolution. The dyestuff solution was poured onto ice and the dyestuff precipitated. It was filtered, then introduced by stirring into a mixture of ice and water, and after neutralisation with sodium acetate it was salted out by strewing sodium sulfate, filtered and dried. A dark red brown powder was obtained which dissolved in water with a bluish red color. The new xanthenium dyestuff corresponded to the formula

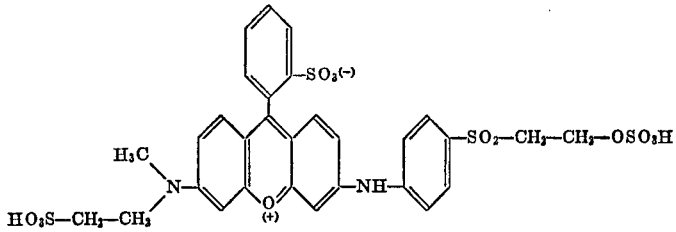

A cotton fabric was impregnated with a bath, which contained 40 g. of the so-obtained dyestuff, 30 g. of sodium sulfate and 16 ml. of a 32.5% sodium hydroxide solution per liter, rolled on a skein, packed into a plastic film and allowed to stay for 8 hours. After rinsing and soaping a very brilliant bluish red dyeing of good fastness to wet processing was obtained.

EXAMPLE 3

24.5 parts of 3-amino-4-methoxy-phenyl-β-hydroxy-ethyl-sulfone were dissolved in 200 parts of hot water and mixed portionwise at 80° C. with 40.5 parts of 3,6-dichloroxanthylium-9-phenyl-2'-sulfonate. After stirring for two hours at 80° C. the whole was filtered, washed with water and dried. Then this condensation product was introduced at 130° C. into a solution of 32.5 parts of the sodium salt of N-methyl-taurine and 40 parts of glycol and stirred for 3 hours at this temperature. The reaction mixture was poured into the water and the resulting dyestuff was isolated by salting out with sodium sulfate. The dyestuff suction-filtered, dried and ground was then esterified by introducing into the fourfold amount of sulfuric acid of 100% strength. The resulting solution was introduced by stirring into an ice-water-mixture, the dyestuff being precipitated. It was suction-filtered, mixed with ice water and neutralized with diluted sodium hydroxide solution. The dyestuff was isolated by salting out with sodium sulfate, suction-filtering and drying. The resulting xanthenium dyestuff corresponded to the formula

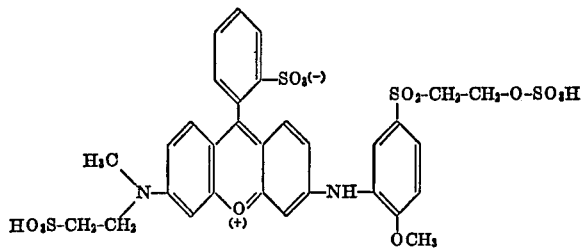

It dissolved in water with a bluish red color and yielded on wool bluish red dyeings fast to washing.

EXAMPLE 4

20.1 parts of 3-amino-β-hydroxy-ethylsulfone were stirred for 1 hour at 80° C. in 100 parts of water with 3,6-dichloroxanthylium - 9 - phenyl-2'-sulfonate. The condensation product was suction-filtered and washed with water until neutral. Then the filter cake was mixed with 100 parts of water. The whole was heated up to the boiling point and 15 parts of n-propylamine were added. When the condensation was terminated, the crystalline dyestuff was suction-filtered, washed with water, dried and ground. The dyestuff powder was introduced into the fourfold amount of sulfuric acid of 100% strength. The resulting solution was poured onto ice, the dyestuff being precipitated. It was suction-filtered, mixed in 500 parts of water and neutralized with sodium acetate. The dyestuff was salted out with sodium chloride.

It corresponded to the formula

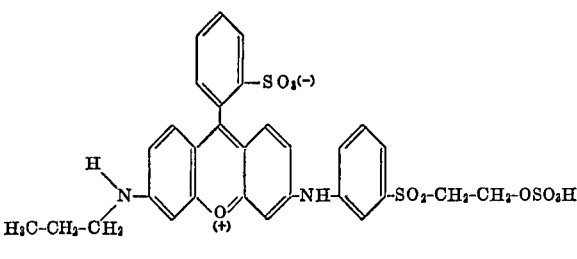

The dyestuff dissolved in water with a bluish red color and provided in the presence of sodium bicarbonate a very brilliant bluish red cotton print having good fastness to wet processing.

EXAMPLE 5

57.3 parts of the condensation product of 3,6-dichloroxanthylium-9-phenyl-2'-sulfonate and 3-amino-phenyl-β-hydroxy-ethylsulfone were introduced at 90° C. into a solution of 20 parts of piperidine and 200 parts of glycol and stirred for 1 hour at 130° C. The resulting dyestuff was precipitated by diluting with 700 parts of water, filtered, washed with water and dried. It was introduced in a pulverized form into 200 parts of sulfuric acid of 100% strength and stirred until complete dissolution. The whole was worked up in usual manner and the resulting dyestuff which as free acid corresponded to the formula

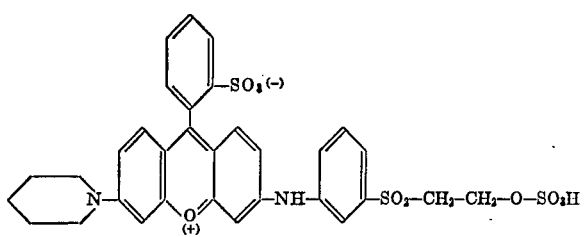

was isolated by salting out with sodium chloride. Its aqueous solution had a bluish red color. When dyeing or printing cellulose fibres without alkaline agents but with an alkaline after-treatment, bluish red dyeings or prints fast to washing were obtained.

EXAMPLE 6

8.1 parts of the sodium salt of N-methyl-taurine were mixed at room temperature with 20 parts of 3,6-dichloro-xanthylium-9-phenyl-2'-sulfonate in a mixture consisting of 100 parts of water and 10 parts of sodium acetate. The intermediate obtained was salted out with sodium chloride, filtered and dried. In 100 parts of glycol it was reacted for two hours at 160° C. with 23 parts of 2-methyl-5-amino-benzyl - β - hydroxy-ethylsulfone. The reaction mixture was poured into water, mixed with potassium carbonate until the hydroxy dyestuff was precipitated and filtered. The filtered product was mixed again by stirring with water and neutralized with sulfuric acid. Then the dyestuff was isolated by evaporating until dry and subsequently esterified at 20° C. with the threefold amount of concentrated sulfuric acid. After pouring onto ice the whole was neutralized with calcium carbonate, filtered from the calcium sulfate and the ester dyestuff in the filtrate was isolated by salting out with sodium sulfate. A dark red violet powder was obtained which dissolved in water with a red violet color.

The new dyestuff corresponded in form of the free acid to the formula

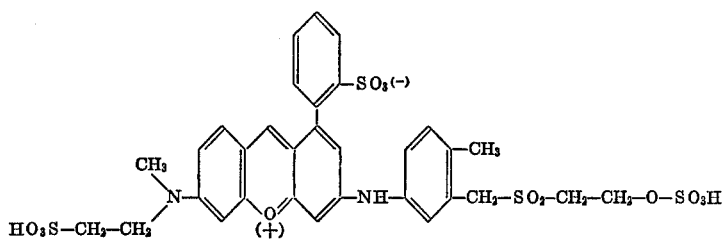

A 2% dyeing prepared in usual manner in a slightly acidic bath provided on polyamide fibres after a slight alkaline after-treatment a red violet dyeing of good fastness to washing.

EXAMPLE 7

100 parts of the dyestuff obtained according to Example 1 were dissolved in 500 parts of water and adjusted to pH 12 by means of 40 parts of diluted sodium hydroxide solution. After stirring for a short time at this pH value, the solution was neutralized with hydrochloric acid and the reaction product was salted out, filtered and dried.

The dyestuff dissolved in water with a bluish red color and powder, corresponded to the formula

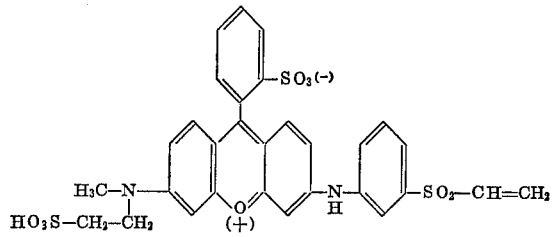

The dyestuff which was obtained as a dark red brown provided on cellulose fibres in the presence of sodium carbonate brilliant bluish red dyeings and prints having good to very good fastness properties.

EXAMPLE 8

100 parts of the dyestuff obtained according to Example 2 were dissolved in 500 parts of water and mixed with 7.5 parts of diethylamine. By adding 40 parts of diluted sodium hydroxide solution, the pH value was adjusted to 12 and the mixture was stirred overnight. Then it was neutralized with diluted hydrochloric acid and mixed with sodium sulfate. The precipitated dyestuff corresponded to the formula

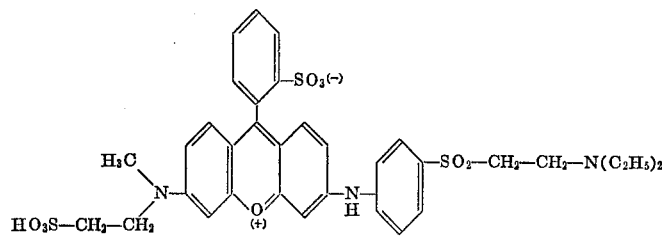

It dissolved in water with a bluish red color and provided on cellulose fibre fabrics in the presence of sodium hydroxide solution a brilliant bluish red print having good to very good fastness properties.

The dyestuffs listed in the following table may be prepared in analogous way, as described in the above examples. They yield on cellulose fibre materials likewise dyeings and prints exhibiting similar good fastness properties.

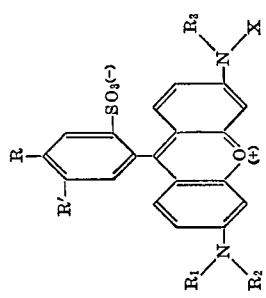

| | R | R' | $R_1$ | $R_2$ | $R_3$ | X | Shade on cotton |
|---|---|---|---|---|---|---|---|
| 1 | —H | —H | —CH$_2$—CH$_2$—O—SO$_3$H | —H | —H | ⌬—SO$_2$—CH$_2$—CH$_2$—O—SO$_3$H | Bluish red. |
| 2 | —H | —H | —CH$_2$—COOH | —H | —H | Same as above | Do. |
| 3 | —H | —H | —CH$_2$—COOH | —CH$_2$—COOH | —H | do. | Do. |
| 4 | —H | —H | —CH$_2$—CH$_2$—SO$_3$H | —H | —H | do. | Do. |
| 5 | —H | —H | —CH$_2$—CH$_2$—SO$_3$H | —CH$_3$ | —H | ⌬—SO$_2$—CH$_2$—S—SO$_3$H | Do. |
| 6 | —H | —H | —CH$_2$—CH$_2$—SO$_3$H | —CH$_3$ | —H | ⌬—SO$_2$—CH$_2$—CH$_2$—O—PO$_3$H$_2$ | Do. |
| 7 | —SO$_3$H | —H | —CH$_2$—CH$_2$—CH$_3$ | —H | —H | ⌬—SO$_2$—CH$_2$—CH$_2$—O—SO$_3$H | Do. |
| 8 | —Cl | —H | —CH$_2$—CH$_2$—SO$_3$H | —CH$_3$ | —H | ⌬—SO$_2$—CH$_2$—CH$_2$—O—SO$_3$H | Do. |
| 9 | —H | —H | —CH$_2$—CH$_2$—SO$_3$H | —CH$_3$ | —H | ⌬—CH$_2$—SO$_2$—CH$_2$—CH$_2$—O—SO$_3$H | Reddish violet. |
| 10 | —H | —H | —CH$_2$—CH$_2$—SO$_3$H | —CH$_3$ | —H | ⌬—CH$_2$—SO$_2$—CH$_2$—CH$_2$—O—SO$_3$H | Bluish red. |
| 11 | —H | —H | —CH$_2$—CH$_2$—SO$_3$H | —CH$_3$ | —H | CH$_3$O—⌬—CH$_2$—SO$_2$—CH$_2$—CH$_2$—O—SO$_3$H | Violet. |
| 12 | —OC$_2$H$_5$ | —H | —CH$_2$—CH$_2$—SO$_3$H | —CH$_3$ | —H | CH$_3$—⌬—CH$_2$—SO$_2$—CH$_2$—CH$_2$—O—SO$_3$H | Reddish violet. |
| 13 | —H | —H | —CH$_2$—CH$_2$—SO$_3$H | —CH$_3$ | —H | CH$_3$—⌬—CH$_2$—SO$_2$—CH$_2$—CH$_2$—O—SO$_3$H | Violet. |

TABLE—Continued

| # | R | R' | R₁ | R₂ | R₃ | X | Shade on cotton |
|---|---|----|----|----|----|---|-----------------|
| 14 | —H | —H | —CH₂—CH₂—SO₃H | —CH₃ | —H | —C₆H₄—CH₂—CH₂—SO₂—CH₂—CH₂—O—SO₃H | Bluish red. |
| 15 | —H | —H | —CH₂—CH₂—SO₃H | —CH₃ | —H | —CH₂—C₆H₄—SO₂—CH₂—CH₂—O—SO₃H | Do. |
| 16 | —H | —H | —CH₂—CH₂—SO₃H | —CH₃ | —H | —CH₂—CH₂—C₆H₄—SO₂—CH₂—CH₂—O—SO₃H | Do. |
| 17 | —H | —H | —CH₂—CH₂—SO₃H | —CH₃ | —C₂H₅ | —NH—C₆H₄—SO₂—CH₂—CH₂—O—SO₃H | Do. |
| 18 | —H | —H | —CH₂—CH₂—SO₃H | —CH₃ | —H | —C₆H₄—CO—NH—C₆H₄—SO₂—CH₂—CH₂—O—SO₃H | Reddish violet. |
| 19 | —H | —H | —CH₂—CH₂—SO₃H | —CH₃ | —H | —(naphthyl)—SO₂—CH₂—CH₂—O—SO₃H | Bluish red. |
| 20 | —H | —H | —CH₂—CH₂—SO₃H | —CH₃ | —H | —(naphthyl)—CH₂—SO₂—CH₂—CH₂—O—SO₃H | Do. |
| 21 | —H | —H | —CH₂—CH₂—SO₃H | —CH₃ | —H | —(naphthyl)—S—O₂—CH₂—CH₂—O—SO₃H | Do. |
| 22 | —H | —H | —CH₂—CH₂—SO₃H | —CH₃ | —H | —(naphthyl)—SO₂—CH₂—CH₂—S—SO₃H | Do. |
| 23 | —H | —H | —CH₂—CH₂—SO₃H | —CH₃ | —H | —C₆H₄—C₆H₄—SO₂—CH₂—CH₂—O—SO₃H | Red violet. |
| 24 | —H | —H | —CH₂—CH₂—SO₃H | —CH₃ | —H | —C₆H₄—NH—C₆H₃(NO₂)—SO₂—CH₂—CH₂—O—SO₃H | Blue violet. |
| 25 | —H | —H | —CH₂—CH₂—SO₃H | —CH₃ | —H | —C₆H₄—N=N—C₆H₃(CH₃)—SO₂—CH₂—CH₂—O—SO₃H | Violet. |

TABLE—Continued

| | R | R' | R₁ | R₂ | R₃ | X | Shade on cotton |
|---|---|---|---|---|---|---|---|
| 26 | —COOH | —H | —CH₂—CH₂—SO₃H | —H | —H | —C₆H₄—SO₂—CH₂—CH₂—O—SO₃H | Bluish red. |
| 27 | —H | —H | —C₂H₅ | —C₂H₅ | —H | Same as above | Do. |
| 28 | —OH | —COOH | —C₂H₅ | —C₂H₅ | —H | —C₆H₄—SO₂—CH₂—CH₂—O—SO₃H | Do. |
| 29 | —H | —H | —C₆H₁₁ | —H | —H | Same as above | Do. |
| 30 | —H | —H | —CH₂—(tetrahydropyranyl) | —H | —H | do. | Do. |
| 31 | —H | —H | —CH₂—C₆H₅ | —H | —H | do. | Do. |
| 32 | —H | —H | —CH₂—CH₂—C₆H₅ | —H | —H | do. | Do. |
| 33 | —H | —H | —CH₂—CH₂—SO₃H | —CH₃ | —H | —C₆H₄—N(CH₃)—SO₂—CH₂—CH₂—O—SO₃H | Violet. |
| 34 | —H | —H | —CH₂—CH₂—SO₃H | —CH₃ | —H | —C₆H₃(OCH₃)—N(CH₃)—SO₂—CH₂—CH₂—O—SO₃H | Do. |
| 35 | —H | —H | —CH₂—CH₂—SO₃H | —CH₃ | —H | —C₆H₃(Cl)—N(CH₃)—SO₂—CH₂—CH₂—O—SO₃H | Do. |
| 36 | —H | —H | —CH₂—CH₂—SO₃H | —CH₃ | —H | —C₆H₄—N(CH₂—CH₂—CH₃)—SO₂—CH₂—CH₂—O—SO₃H | Do. |
| 37 | —H | —H | —CH₂—CH₂—SO₃H | —CH₃ | —H | —C₆H₄—SO₂—NH—C₆H₄—SO₂—CH₂—CH₂—O—SO₃H | Bluish red. |
| 38 | —H | —H | —CH₂—CH₂—SO₃H | —CH₃ | —H | —C₆H₄—SO₂—CH₂—CH₂—O—CO—CH₃ | Do. |
| 39 | —H | —H | —CH₂—CH₂—SO₃H | —CH₃ | —H | —C₆H₄—SO₂—CH₂—CH₂—OH | Do. |
| 40 | —H | —H | —CH₂—CH₂—SO₃H | —CH₃ | —H | —C₆H₄—SO₂—CH₂—CH₂—O—C₆H₅ | Do. |

TABLE—Continued

| | R | R¹ | R₁ | R₂ | R₃ | X | Shade on cotton |
|---|---|---|---|---|---|---|---|
| 41 | —H | —H | —CH₂—CH₂—SO₃H | —CH₃ | —H | ![phenyl-SO₂—CH₂—CH₂—Cl] | Bluish red. |
| 42 | —H | —H | —CH₂—CH₂—SO₃H | —CH₃ | —H | ![phenyl-SO₂—CH₂—CH₂—O—SO₂—C₆H₄—CH₃] | Do. |
| 43 | —H | —H | —CH₂—CH₂—SO₃H | —CH₃ | —H | ![HO-phenyl-SO₂—CH₂—CH₂—OSO₃H] | Reddish violet. |
| 44 | —H | —H | —CH₂—CH₂—SO₃H | —CH₃ | —H | ![HOOC-phenyl-SO₂—CH₂—CH₂—OSO₃H] | Bluish red. |
| 45 | —H | —H | —CH₂—CH₂—SO₃H | —CH₃ | —H | ![HO₃S-phenyl-SO₂—CH₂—CH₂—OSO₃H] | Do. |
| 46 | —H | —H | —CH₂—CH₂—SO₃H | —CH₃ | —H | ![H₃CO-phenyl(CH₃)-SO₂—CH₂—CH₂—OSO₃H] | Do. |
| 47 | —CH₃ | —H | —CH₂—CH₂—SO₃H | —CH₃ | —H | ![phenyl-SO₂—CH₂—CH₂—OSO₃H] | Do. |
| 48 | —H | —H | —CH₂—CH₂—SO₃H | —CH₃ | —H | ![phenyl-SO₂—CH₂—CH₂—OSO₂—CH₃] | Do. |

We claim:
1. A water-soluble reactive xanthenium dyestuff of the Formula 1

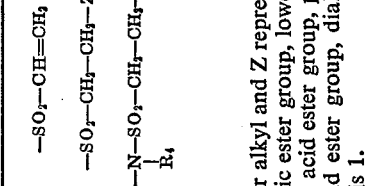

wherein R represents hydrogen, chlorine, hydroxyl, lower alkoxy, lower alkyl, carboxyl or a sulfonic acid group, R' represents hydrogen or, when R is hydroxyl, carboxyl, R₁ represents lower alkyl, sulfo lower alkyl, sulfatoloweralkyl or carboxyloweralkyl, R₂ represents hydrogen, lower alkyl or carboxylower alkyl, R₃ represents hydrogen or lower alkyl, A represents phenylene, lower alkyl-phenylene, lower alkoxy-phenyl, lower alkyl-alkoxy-phenylene, carboxyalkylene phenylene, phenylene loweralkylene, carboxyphenylene, hydroxyphenylene, monosulfophenylene, chlorophenylene or naphthylene, Y represents a grouping selected from $-SO_2-CH=CH_2$ $-SO_2-CH_2-CH_2-Z$ $-N-SO_2-CH_2-CH_2-Z$
  $\overset{|}{R_4}$ wherein R₄ is lower alkyl and Z represents hydroxyl, chlorine, an arylsulfonic ester group, lower alkylsulfonic ester group, thiosulfuric acid ester group, phosphoric acid ester group, sulfuric acid ester group, dialkylamino, acetyloxy or phenoxy and p is 1.

2. A water-soluble reactive xanthenium dyestuff of the Formula 1

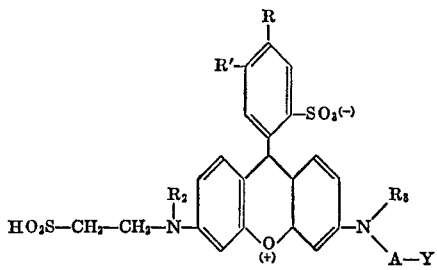

wherein R represents hydrogen, chlorine, hydroxyl, lower alkoxy, lower alkyl, carboxyl or a sulfonic acid group, R' represents hydrogen or, when R is hydroxy, carboxyl, $R_3$ represents hydrogen or lower alkyl, $R_2$ represents hydrogen or lower alkyl, A represents phenylene, lower alkyl-phenylene, lower alkoxy-phenylene, lower alkyl-alkoxy-phenylene, carboxy-phenylene, hydroxy-phenylene, monosulfophenylene, Y represents a grouping of the formula

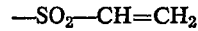

or

wherein Z represents hydroxyl, chlorine, an arylsulfonic ester group, lower alkylsulfonic ester group, thiosulfuric acid ester group, phosphoric acid ester group, sulfuric acid ester group, dialkylamino, acetyloxy or phenoxy.

3. The dyestuff of the formula

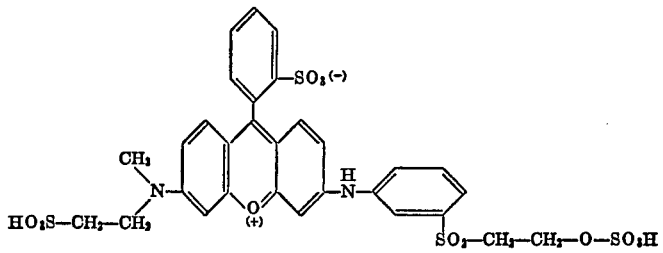

4. The dyestuff of the formula

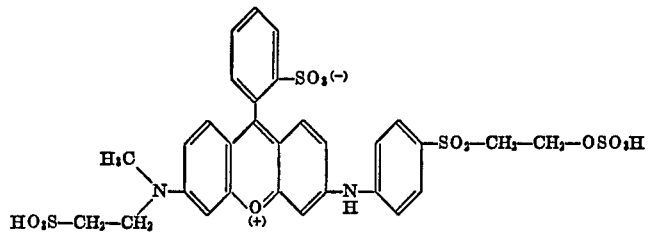

5. The dystuff of the formula

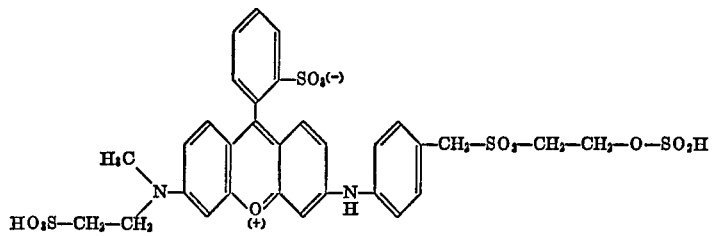

6. The dyestuffs of the formula

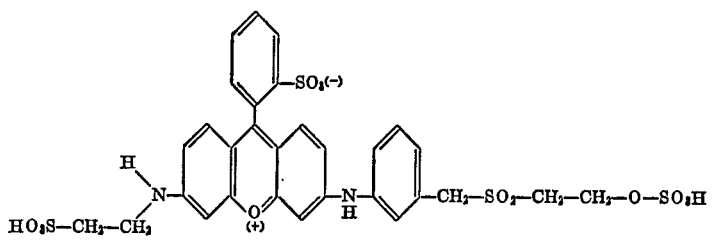

7. The dyestuff of the formula

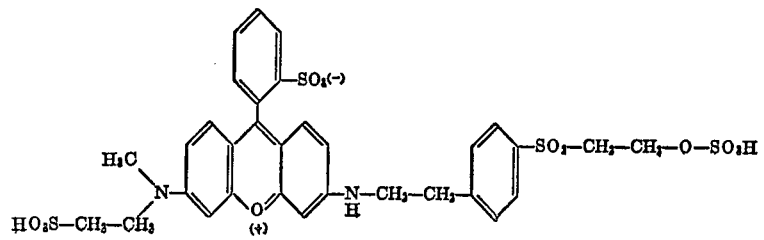

8. The dyestuff of the formula

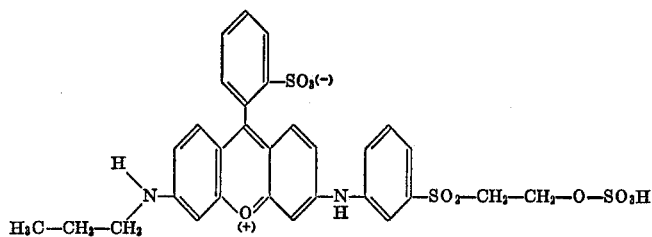

9. The dyestuff of the formula

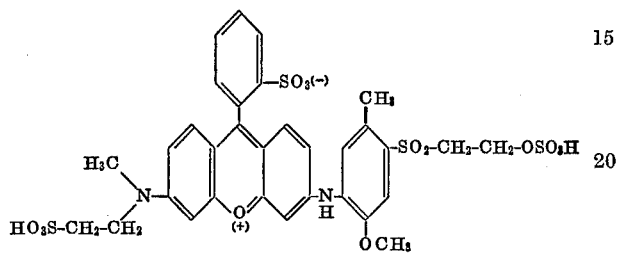

References Cited

UNITED STATES PATENTS

| | | | |
|---|---|---|---|
| 2,213,460 | 9/1940 | Eckert et al. | 260—336 |
| 2,238,215 | 4/1941 | Eckert et al. | 260—336 |
| 3,100,131 | 8/1963 | Freyermuth et al. | 260—374 |
| 3,277,075 | 10/1966 | Mayhew et al. | 260—336 |
| 2,242,572 | 5/1941 | Eckert et al. | 260—336 |

FOREIGN PATENTS 500,513  1/1951  Belgium _____ 260—336

OTHER REFERENCES

T. S. Gore et al.: Recent Progress in the Chemistry of Natural and Synthetic Colouring Matters (1962), Academic Press, pp. 483.

NORMA S. MILESTONE, Primary Examiner

U.S. Cl. X.R.

260—247.1, 293.58, 152; 8—12, 54, 54.2, 178